(12) United States Patent
Matsumoto et al.

(10) Patent No.: US 10,137,778 B2
(45) Date of Patent: Nov. 27, 2018

(54) CONTENT STARTUP CONTROL DEVICE, CONTENT STARTUP METHOD, AND CONTENT STARTUP SYSTEM

(71) Applicant: Clarion Co., Ltd., Saitama-shi, Saitama (JP)

(72) Inventors: Yusuke Matsumoto, Saitama (JP); Noriyuki Abe, Yokohama (JP); Kimio Okamoto, Yokohama (JP); Tetsuya Yamada, Chigasaki (JP); Takuya Fujieda, Tokyo (JP)

(73) Assignee: Clarion Co., Ltd., Saitama-shi (JP)

( * ) Notice: Subject to any disclaimer, the term of this patent is extended or adjusted under 35 U.S.C. 154(b) by 14 days.

(21) Appl. No.: 15/096,373

(22) Filed: Apr. 12, 2016

(65) Prior Publication Data
US 2016/0303973 A1    Oct. 20, 2016

(30) Foreign Application Priority Data
Apr. 14, 2015    (JP) .................. 2015-082365

(51) Int. Cl.
*B60K 35/00* (2006.01)
*H04N 21/25* (2011.01)
(Continued)

(52) U.S. Cl.
CPC ........... *B60K 35/00* (2013.01); *H04N 21/252* (2013.01); *H04N 21/41422* (2013.01);
(Continued)

(58) Field of Classification Search
CPC ................. B60K 35/00; H04N 21/252; H04N 21/41422; H04N 21/42202
See application file for complete search history.

(56) References Cited

U.S. PATENT DOCUMENTS

2002/0142722 A1   10/2002   Gutta et al.
2008/0201000 A1    8/2008   Heikkila et al.
(Continued)

FOREIGN PATENT DOCUMENTS

| EP | 2 403 267 A2 | 1/2012 |
| JP | 2005-84752 A | 3/2005 |
| JP | 2008-201217 A | 9/2008 |

OTHER PUBLICATIONS

European Search Report issued in counterpart European Application No. 16165211.0 dated Jul. 28, 2016 (eight pages).

*Primary Examiner* — Michael D Lang
(74) *Attorney, Agent, or Firm* — Crowell & Moring LLP

(57) ABSTRACT

A content startup control device includes: a reception unit that receives an instruction from a user to select a content; a vehicle information acquisition unit that acquires information from a vehicle and/or information on traveling as vehicle information; a startup recording unit that stores the vehicle information, which is acquired by the vehicle information acquisition unit when the content is selected or started up in response to the instruction received by the reception unit, as a startup record of the content; a condition creation unit that creates a startup condition under which the content is to be started up based on the startup record; and a content startup control unit that, if the vehicle information acquired from the vehicle information acquisition unit corresponds to the startup condition, proposes startup of a content related to the startup condition or starts up the content related to the startup condition.

7 Claims, 16 Drawing Sheets

(51) Int. Cl.
   *H04N 21/414*     (2011.01)
   *H04N 21/422*     (2011.01)
   *H04N 21/442*     (2011.01)
   *H04N 21/45*      (2011.01)
   *H04N 21/466*     (2011.01)
   *H04N 21/6543*    (2011.01)
   *H04N 21/658*     (2011.01)

(52) U.S. Cl.
   CPC . *H04N 21/42202* (2013.01); *H04N 21/44222* (2013.01); *H04N 21/4524* (2013.01); *H04N 21/4532* (2013.01); *H04N 21/4668* (2013.01); *H04N 21/6543* (2013.01); *H04N 21/6582* (2013.01)

(56) References Cited

U.S. PATENT DOCUMENTS

2010/0312369 A1   12/2010   Dollar, Jr.
2013/0080371 A1   3/2013    Harber et al.

FIG.2

| | VEHICLE INFORMATION | THRESHOLD | SEGMENT |
|---|---|---|---|
| V1 | VEHICLE SPEED | 0km/h | 0 |
| | | 0<V1≦60km/h | 1 |
| | | 60<V1≦80km/h | 2 |
| | | 80km/h<V1 | 3 |
| V2 | WIPER | OPERATED FOR 15 SECONDS OR LESS | 0 |
| | | OPERATED FOR A TIME LONGER THAN 15 SECONDS | 1 |
| V3 | HEADLIGHT | LIT FOR 15 SECONDS OR LESS | 0 |
| | | LIT FOR A TIME LONGER THAN 15 SECONDS | 1 |
| V4 | WINKER | UNOPERATED | 0 |
| | | OPERATED | 1 |
| V5 | FUEL LEVEL | V5≦20% | 0 |
| | | 20<V5≦60% | 1 |
| | | 60<V5≦100% | 2 |
| V6 | TIME | IN UNITS OF 30 MINUTES | TIME OF DAY OF 0 HOUR 0 MINUTE OR MORE AND LESS THAN 0 HOUR 30 MINUTES IS DESIGNATED AS SEGMENT 0 AND SUBSEQUENTLY THE SEGMENT NUMBER IS INCREASED BY 1 FOR EVERY 30 MINUTES. |
| V7 | TRAVELING TIME | IN UNITS OF 10 MINUTES | 0 MINUTE OR MORE TO LESS THAN 10 MINUTES FROM THE START OF TRAVELING IS DESIGNATED AS SEGMENT 0 AND SUBSEQUENTLY THE SEGMENT NUMBER IS INCREASED BY 1 FOR EVERY 10 MINUTES. |
| V8 | TIME TAKEN TO REACH DESTINATION | IN UNITS OF 10 MINUTES | REMAINING TIME UNTIL THE DESTINATION IS REACHED OF 0 MINUTE OR MORE TO LESS THAN 10 MINUTES IS DESIGNATED AS SEGMENT 0 AND SUBSEQUENTLY THE SEGMENT NUMBER IS INCREASED BY 1 FOR EVERY 10 MINUTES. |
| V9 | ROAD TYPE | OPEN ROAD | 0 |
| | | HIGHWAY ROAD | 1 |
| V10 | TRAFFIC JAM INFORMATION | NOT JAMMED | 0 |
| | | JAMMED | 1 |
| V11 | POSITION INFORMATION | POSITION WITHIN 200m | POSITION INFORMATION |

FIG.3

| CONTENT NAME | ID | USAGE INFORMATION |
|---|---|---|
| RADIO | 001 | V1, V6, V7, V8, V9, V11 |
| WEATHER FORECAST | 002 | V1, V2, V6, V7, V8, V9 |
| E-MAIL | 003 | V1, V6, V8, V9, V11 |
| CONVENIENCE STORE RETRIEVAL | 004 | V1, V5, V7, V9, V10, V11 |

FIG.4

| | CONTENT NAME | ID | URL | PRIORITY | V1 | V2 | V3 | V4 | V5 | V6 | V7 | V8 | V9 | V10 | V11 |
|---|---|---|---|---|---|---|---|---|---|---|---|---|---|---|---|
| C1 | RADIO | 001 | www//U1 | 3 | 2 | | | | | 11 | 1 | 8 | 0 | | x1, y1 |
| C2 | WEATHER FORECAST | 002 | www//U2 | 2 | 3 | 1 | | | | 13 | 3 | 7 | 1 | | |
| C3 | E-MAIL | 003 | www//U3 | 4 | 1 | | | | | 12 | | 5 | 0 | | x3, y3 |
| C4 | RADIO | 001 | www//U1 | 3 | 1 | | | | | 11 | 1 | 9 | 0 | | x1, y1 |

FIG.5

| CONTENT NAME | ID | URL | PRIORITY | V1 | V2 | V3 | V4 | V5 | V6 | V7 | V8 | V9 | V10 | V11 |
|---|---|---|---|---|---|---|---|---|---|---|---|---|---|---|
| RADIO | 001 | www://U1 | 3 | | | | | | 11 | 1 | | 0 | | x1, y1 |

FIG.10

| USER NAME | CONTENT NAME | ID | URL | PRIORITY | V1 | V2 | V3 | V4 | V5 | V6 | V7 | V8 | V9 | V10 | V11 |
|---|---|---|---|---|---|---|---|---|---|---|---|---|---|---|---|
| A | RADIO | 001 | www//U1 | 3 | 2 | | | | | 11 | 1 | 8 | 0 | | x1, y1 |
| C | RADIO | 001 | www//U1 | 3 | 1 | | | | | 11 | 2 | 8 | 0 | | x2, y2 |
| D | RADIO | 001 | www//U1 | 3 | 2 | | | | | 11 | 1 | 8 | 0 | | x4, y4 |
| B | RADIO | 001 | www//U1 | 3 | 1 | | | | | 11 | 2 | 9 | 0 | | x7, y7 |
| E | RADIO | 001 | www//U1 | 3 | 2 | | | | | 11 | 1 | 8 | 0 | | x6, y6 |

| CONTENT NAME | ID | URL | PRIORITY | V1 | V2 | V3 | V4 | V5 | V6 | V7 | V8 | V9 | V10 | V11 |
|---|---|---|---|---|---|---|---|---|---|---|---|---|---|---|
| RADIO | 001 | www//U1 | 3 | | | | | | 11 | | 8 | 0 | | |

CONTENT STARTUP CONTROL DEVICE, CONTENT STARTUP METHOD, AND CONTENT STARTUP SYSTEM

INCORPORATION BY REFERENCE

The disclosure of the following priority application(s) is/are herein incorporated by reference: Japanese Patent Application No. 2015-082365 filed Apr. 14, 2015

BACKGROUND OF THE INVENTION

1. Field of the Invention

The present invention relates to a content startup device, a content startup method, and a content startup system that provide various types of information via a terminal device used in a vehicle.

2. Description of Related Art

A terminal device mounted on a vehicle has many functions. For instance, the terminal device is configured to display on its screen icons allotted to these functions to be provided by corresponding contents programs. If the user selects any one of the icons to specify a function corresponding to the selected icon, a content program corresponding to the specified function is started up to provide desired information. Examples of the content programs include a program for listening to a radio, a program for acquiring weather forecast, program for receiving/transmitting e-mail, and a program for locating a convenience store. Hereafter, these programs are referred to as radio content, weather forecast content, e-mail content, and convenience store retrieval content, respectively. Also, these are simply referred to as content collectively. The information acquired by a content program from a content server may be referred to as content.

JP 2005-84752 A discloses a device that receives content according to a broadcast program information from a server. According to JP 2005-84752 A, various types of information are provided at the terminal device as follows. That is, an appropriate content is selected from the contents included in candidate content list information based on, for instance, conditions on the user side, such as the liking of the user and conditions of the vehicle, and conditions relating to contents, such as category of contents. The order of reproduction of contents is determined to create broadcast program information and the created broadcast program information is transmitted to the content server. This enables the contents according to the broadcast program information to be received from the content server and to be reproduced.

SUMMARY OF THE INVENTION

In the system described in the above-mentioned publication, many functions of the terminal device are executed in response to corresponding content startup operations by the user to start up contents. Consequently, a content startup operation is indispensable for each function. This is troublesome and time consuming.

A content startup control device according to a first aspect of the present invention comprises: a reception unit that receives an instruction from a user to select a content; a vehicle information acquisition unit that acquires information from a vehicle and/or information on traveling as vehicle information; a startup recording unit that stores the vehicle information, which is acquired by the vehicle information acquisition unit when the content is selected or started up in response to the instruction received by the reception unit, as a startup record of the content; a condition creation unit that creates a startup condition under which the content is to be started up based on the startup record; and a content startup control unit that, if the vehicle information acquired from the vehicle information acquisition unit corresponds to the startup condition, proposes startup of a content related to the startup condition or starts up the content related to the startup condition.

According to a second aspect of the present invention, in the content startup control device according to the first aspect, it is preferable that: the condition creation unit stores vehicle information that is common to a plurality of startup records relating to an identical content in the acquired vehicle information as the startup condition of the content.

A content startup method according to a third aspect of the present invention comprises: receiving an instruction from a user to select a content; acquiring information from a vehicle and/or information on traveling as vehicle information; storing the vehicle information acquired when the content is selected or started up in response to the instruction received as a startup record of the content; creating a startup condition under which the content is to be started up based on the startup record of the content; and proposing startup of a content related to the startup condition or starting up the content related to the startup condition if the vehicle information acquired corresponds to the startup condition.

A content startup system according to a fourth aspect of the present invention comprises: a terminal device and a server device, wherein: the terminal device includes: a reception unit that receives an instruction from a user to select a content; a vehicle information acquisition unit that acquires information from a vehicle and/or information on traveling as vehicle information; and a transmission unit that transmits the vehicle information, which is acquired by the vehicle information acquisition unit when a content is selected or started up in response to the instruction received by the reception unit, as a startup record of the content; and the server device includes: a reception unit that receives the vehicle information and the startup record transmitted by the transmission unit; a storage unit that stores the startup record received by the reception unit; a condition creation unit that creates a startup condition under which the content is to be started up based on the startup record; and a content startup control unit that, if the vehicle information transmitted from the terminal device corresponds to the startup condition, proposes startup of a content related to the startup condition to the terminal device or causes the terminal device to start up the content.

According to a fifth aspect of the present invention, in the content startup system according to the fourth aspect, it is preferable that: the storage unit stores a plurality of startup records relating to a plurality of users, respectively; and the condition creation unit stores vehicle information common to the plurality of startup records relating to an identical content in the received vehicle information as a startup condition.

A content startup method in a system including a terminal device and a server device according to a sixth aspect of the present invention, the method comprises: at the terminal device, receiving an instruction from a user to select a content; acquiring information from a vehicle and/or information on traveling as vehicle information; and transmitting the vehicle information acquired when the content is selected or started up in response to the received instruction, as a startup record of the content; and at the server device, receiving the vehicle information and the startup record that have been transmitted; storing the received startup record;

creating a startup condition under which the content is to be started up based on the stored startup record; and if the received vehicle information corresponds to the created startup condition, proposing startup of a content related to the created startup condition to the terminal device or causing the terminal device to start up the content related to the created startup condition.

BRIEF DESCRIPTION OF THE DRAWINGS

FIG. 2 is a diagram illustrating correspondence relationships among vehicle information, thresholds, and segments.

FIG. 3 is a diagram illustrating a correspondence relationship between contents and usage information.

FIG. 4 is a diagram illustrating storage states in which contents and vehicle information are stored.

FIG. 5 is a diagram illustrating core conditions of contents and of vehicle information.

FIG. 10 is a diagram illustrating the storage state in which contents and vehicle information are stored in the server device.

FIG. 11 is a diagram showing core conditions of contents and of vehicle information in the server device.

DESCRIPTION OF EMBODIMENTS

First Embodiment

Figure 1:
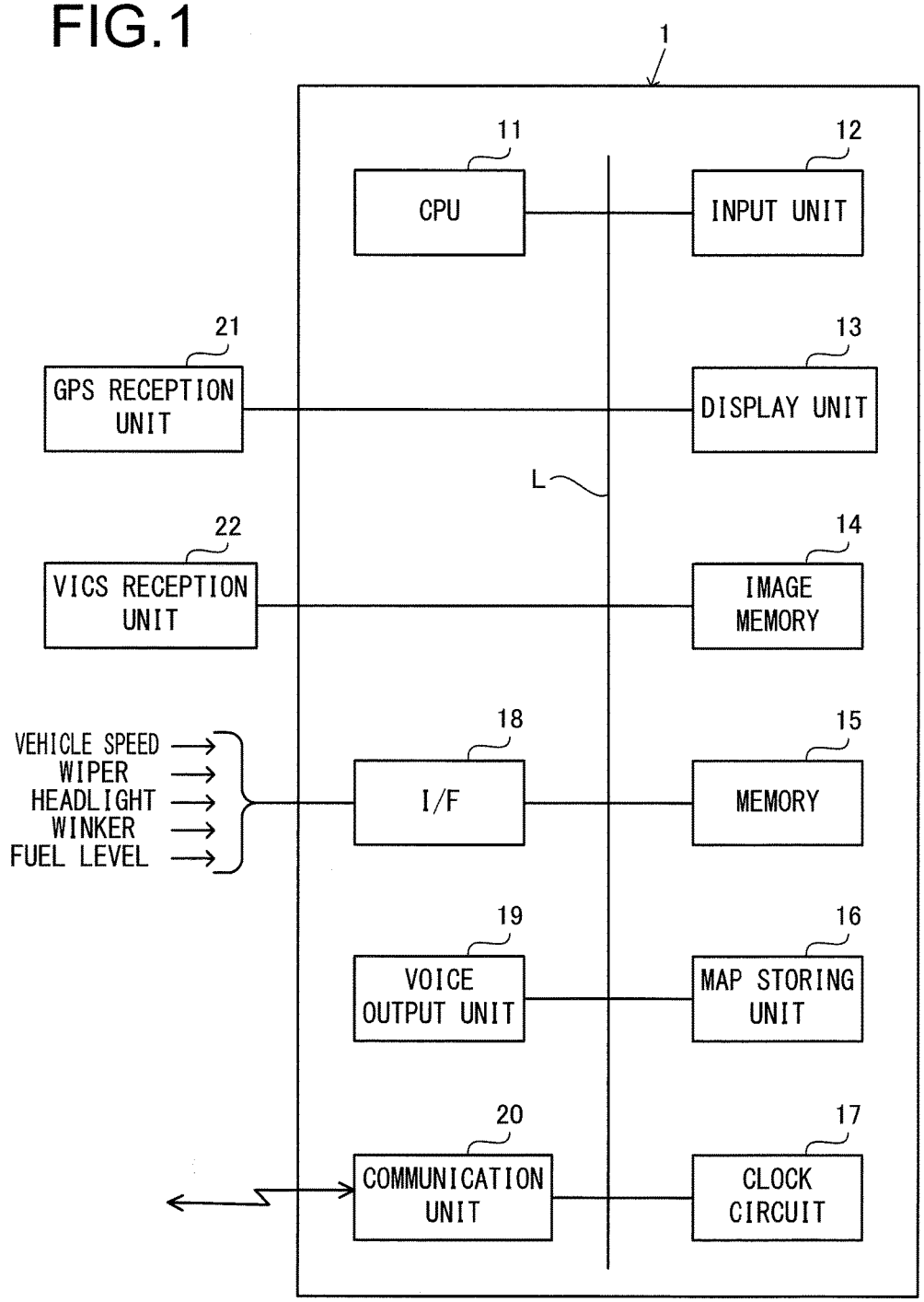
FIG. 1 is a diagram showing an overall arrangement of a terminal device according to an embodiment of the present invention.

With reference to FIGS. 1 to 7, explanation is made on an embodiment in which a content startup control device and content startup method of the present invention are adopted in a terminal device. FIG. 1 is a diagram showing an overall arrangement of the terminal device according to an embodiment of the present invention. A terminal device 1, which is mounted on a vehicle, has a plurality of functions for presenting information about the traveling of a vehicle, such as a function of displaying a road map of the area circumjacent the present position of the vehicle, a function of calculating a recommended route from a point of departure to a destination, and a function of performing route guidance based on the calculated recommended route.

In FIG. 1, the terminal device 1 includes a CPU 11, an input unit 12, a display unit 13, an image memory 14, a memory 15, a map storing unit 16, a clock circuit 17, an interface circuit (I/F) 18, a voice output unit 19, and a communication unit 20. The circuits are each connected with a bus line L. To the bus line L is connected external devices, for instance, a GPS reception unit 21 and a vehicle information and communication system [VICS (registered trademark)] reception unit 22 that receives VICS information.

The CPU 11 accesses the memory 15 and the like to execute a control program to perform various controls. The input unit 12 includes, for instance, a touch panel switch provided on the screen of the display unit 13 and a joystick with which motion of a cursor or scroll of the screen is instructed. The input unit 12 may be a remote control switch or a switch provided on the circumference of the display unit 13. The user can start up radio content, weather forecast content, e-mail content, and convenience store retrieval content and so on by operating the input unit 12. In the following explanation, the radio content, weather forecast content, e-mail content, and convenience store retrieval content and so on that are started up are also referred to as content programs.

The display unit 13, which brings up various screens on display at the terminal device 1, includes for instance, a liquid crystal display. The display unit 13 brings on display, for instance, a map screen and a guidance of a recommended route. The display unit 13 brings on display information about a radio, a weather forecast, an e-mail, a convenience store retrieval, etc. The subject of the screen to be brought on display on the display unit 13 is determined by screen display control performed by the CPU 11. The display unit 13 is arranged at a position where it can be easily seen by the user, such as on a dashboard or in an instrument panel of the vehicle.

The image memory 14 stores, as image data, display data to be output to the display unit 13. The display data that is output from the CPU 11 includes various types of character data and various types of graphic data, such as a road map. The display data is temporarily stored in the image memory 14 and then is output to the display unit 13.

Examples of the memory 15 include a ROM that stores the control program, a RAM as a working area, and a nonvolatile memory that stores various set values. The CPU 11 executes a process for implementing respective functions based on the control program stored in the memory 15 as described later. Specific content of the processing executed then will be explained later with reference to a flowchart. The map storing unit 16 stores various types of information such as road map data and POI information (Point of Interest; information about tourist destination and/or various facilities) used in navigation processing and includes, for instance, a hard disk drive. The map storing unit 16 may be other devices than the hard disk drive, such as a nonvolatile semiconductor memory, other recording media, CD-ROM, and DVD that stores road map data, as well as a read-out device.

The clock circuit 17 times present time of day and the CPU 11 reads this as necessary. To the interface circuit 18 is input information about vehicle speed, ON/OFF of a wiper, ON/OFF of a headlight, ON/OFF of a winker, and fuel level from the vehicle. The voice output unit 19 outputs voice, for instance, in guidance of directions and in radio. The communication unit 20, which is connected to the Internet via a wireless communication line, enables listening to radio, acquisition of weather forecast, and transmission and reception of e-mails and so on. The radio is explained taking a so-called internet radio as an example. However, listening to radio may be achieved similarly when radio broadcast via radio waves is received by a receiver.

The GPS reception unit 21 receives GPS signal transmitted from a GPS satellite. The GPS signal includes information relating to the position of the GPS satellite and the time of day of transmission. Reception of GPS signals from a predetermined number or more of GPS satellites enables calculation of position information of the vehicle as the reception position of GPS signals. The GPS signals received by the GPS reception unit 21 are output to the CPU 11 via the bus line L and utilized for the acquisition of position information.

The VICS reception unit 22 receives VICS information transmitted from an unshown VICS center to the terminal device 1. Reception of the VICS information by the VICS reception unit 22 causes the terminal device 1 to acquire various types of road traffic information including traffic jam information. The traffic jam information provided by the VICS information expresses the crowded situation at each link of the road as classified into three categories, i.e., "smooth", "crowded", and "jammed". The VICS information received by the VICS reception unit 22 is output to the CPU 11 via the bus line L and utilized, for instance, for displaying the traffic jam information or for retrieving a recommended route.

Transmission of the VICS information from the VICS center to the terminal device 1 is achieved using radio wave beacon arranged mainly on highway roads, an optical beacon arranged mainly on open roads, and FM multiplex broadcast. The radio wave beacon or the optical beacon locally transmits through radio waves or light (infrared rays) VICS information to vehicles that pass by around the point at which the beacon is arranged. In contrast, the FM multiplex broadcast is capable of transmitting the VICS information over a relatively broad area.

The CPU 11 acquires information from the vehicle and the information on traveling as vehicle information when the input unit 12 is operated by the user on the vehicle to start up any one of the radio content, weather forecast content, e-mail content, and convenience store retrieval content and so on. The CPU 11 acquires information from the vehicle, which includes, for instance, vehicle speed, ON/OFF of a wiper, ON/OFF of a headlight, ON/OFF of a winker, and fuel level, via the interface circuit 18. The information on traveling includes, for instance, present time of day, traveling time from the start of traveling, time taken to reach the destination, road type, traffic jam information, and position information. The present time of day and the traveling time from the start of traveling are acquired by the clock circuit 17. The time taken to reach the destination and the road type are acquired from the navigation information using the map storing unit 16, etc. Further, the traffic jam information and the position information are acquired by the VICS reception unit 22 and the GPS reception unit 21, respectively.

FIG. 2 is a diagram illustrating the correspondence relationships among the vehicle information, the threshold, and the segment. The correspondence relationships are stored at the memory 15 in advance. The symbol V1 represents vehicle speed. A range in which the vehicle speed is 0 km/h is designated as segment 0. A range in which V1 is 0<V1≤60 km/h is designated as segment 1. A range in which V1 is 60<V1≤80 km/h is designated as segment 2. A range in which V1 is higher than 80 km/h is designated as segment 3. The symbol V2 represents the operation state of a wiper. A state in which the wiper is operated for 15 seconds or less is designated as segment 0 and a state in which the wiper is operated for a time longer than 15 seconds is designated as segment 1. The symbol V3 represents the state of lighting of a headlight. A state in which the headlight is lit for 15 seconds or less is designated as segment 0 and a state in which the headlight is lit for a time longer than 15 seconds is designated as segment 1. The symbol V4 represents the state of operation of a winker (or blinker). A state in which the winker is unoperated is designated as segment 0 and a state in which the winker is operated is designated as segment 1. The symbol V5 represents fuel level. A state in which the fuel level is 20% or less is designated as segment 0, a state in which the fuel level is more than 20% and 60% or less is designated as segment 1, and a state in which the fuel level is more than 60% is designated as segment 2. The symbol V6 represents the time of day in which the startup operation of one or more contents is performed by the user. The range is segmentalized in units of 30 minutes. Specifically, the time of day of 0 hour 0 minute or more and less than 0 hour 30 minutes is designated as segment 0 and subsequently the segment number is increased by 1 for every 30 minutes. The symbol V7 represents the traveling time from the start of traveling, which is segmentalized in units of 10 minutes. Specifically, the range of from 0 minute or more to less than 10 minutes is designated as segment 0 and subsequently the segment number is increased by 1 for every 10 minutes. The symbol V8 represents remaining time until the destination is reached and segmentalized in units of 10 minutes. Specifically, the range of from 0 minute or more to less than 10 minutes is designated as segment 0 and subsequently the segment number is increased by 1 for every 10 minutes. The symbol V9 represents road type. Open road is designated as segment 0 and highway road is designated as segment 1. The symbol V10 represents traffic jam information. A state in which traffic is not jammed is designated as segment 0 and a state in which traffic is jammed is designated as segment 1. A crowded state is not deemed jammed and is designated as segment 0. The symbol V11 represents position information including the latitude and the longitude. If the position information of the vehicle is determined to be within 200 m from an object of comparison upon the comparison described later, the position information is deemed as matching.

FIG. 3 is a diagram showing the correspondence relationship between the content and usage information. This correspondence relationship is stored at the memory 15. Specifically, the usage information to be used in, for instance, the segmentalization described later is defined corresponding to the content name and the content ID. For instance, in the case of radio, V1, V6, V7, V8, V9, and V11 are used. The each content is represented by each unique ID.

FIG. 4 is a diagram showing the state of storage of the content and vehicle information. This correspondence relationship is stored in the memory 15. Specifically, if the user operates the input unit 12 to start up content, such as radio, weather forecast, or e-mail, the acquired vehicle information is segmentalized and stored at the memory 15. Each time when content is started up, respective pieces of information are stored. The stored vehicle information is the vehicle information that corresponds to the usage information shown in FIG. 3. How to store this information is described later. Here, URL is used to access to the Internet and acquire various types of information, such as information about radio, weather forecast, and e-mail transmission and reception information. Priority is used to determine which content is to be started up on a preferential basis when a plurality of contents are considered to be candidates for automatic start up.

FIG. 5 is a diagram showing core conditions of the content and the vehicle information. The core conditions are stored at the memory 15. The core condition is obtained by comparing, among the contents shown in FIG. 4, a plurality of pieces of vehicle information having an identical content and extracting, for instance, a piece of vehicle information having an identical value. In FIG. 5, the two radio contents in FIG. 4 contain common information with respect to URL, priority, V6, V7, V9, and V11. In the first embodiment, the radio content is started up if these conditions, namely, these common pieces of information are matched. These conditions are called core conditions. As described later, if the acquired vehicle information satisfies the core conditions, such content is automatically started up. Alternatively, a configuration may be adopted, in which the startup of content is proposed to allow the user to start up the content according to his intention.

Hereafter, the operations of the content startup control device and the content startup method according to the first embodiment are explained with reference to the flowchart shown in FIGS. 6 and 7.

Figure 6:
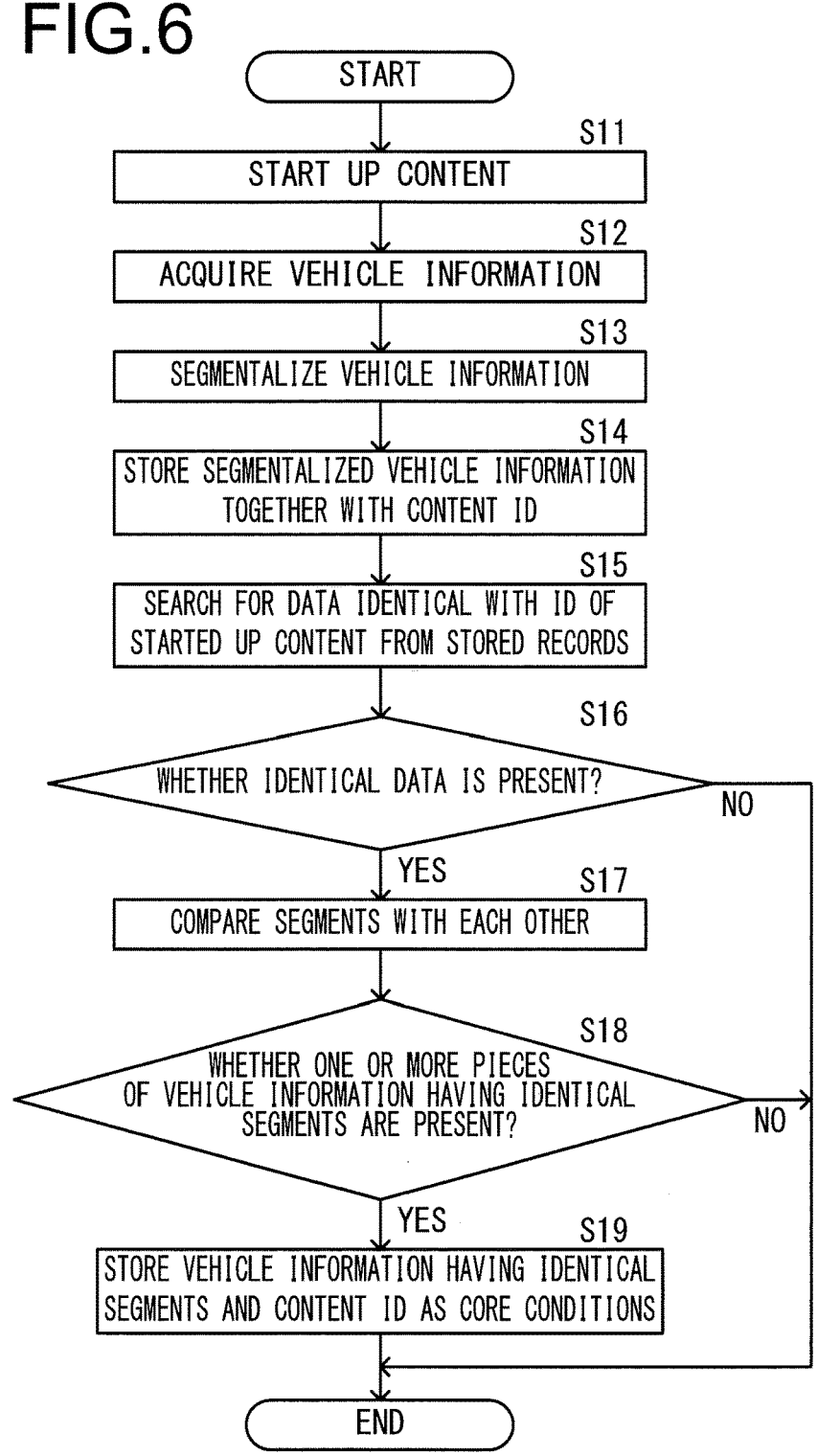
FIG. 6 is a flowchart illustrating storage of vehicle information.

FIG. 6 is a flowchart of storage process of vehicle information. The program illustrated by the flowchart is executed each time when the input unit 12 is operated by the user on the vehicle to start up content, such as radio, weather forecast, e-mail, or convenience store retrieval. The program illustrated by the flowchart is stored at the memory 15 and executed under control by the CPU 11. The same is true for flowcharts described below.

In step S11 of FIG. 6, the CPU 11 starts up the content selected by the operation of the user in the vehicle. Specifically, if the user operates the touch panel of the input unit 12 to specify a radio icon, a weather forecast icon, an e-mail icon, a convenience store retrieval icon or the like listed at the display unit 13, the CPU 11 starts up the specified content. The information acquired by the started-up content program is output to, for instance, the display unit 13 and provided to the vehicle occupant. For instance, if the user specifies the radio icon, the CPU 11 starts up the selected radio station. As a result, the broadcast program that is on air by the radio station is output to the voice output unit 19. The started-up content together with its ID and URL is temporarily stored at the memory 15.

In step S12, the CPU 11 acquires various types of information, such as, a vehicle speed, ON/OFF of the wiper, ON/OFF of the headlight, ON/OFF of the winker, and fuel level, as vehicle information from the vehicle via the interface circuit 18. The CPU 11 also acquires various types of information, such as, present time of day, traveling time from the start of traveling, time taken to reach the destination, type of road, traffic jam information, and position information, as vehicle information from the GPS reception unit 21, the VICS reception unit 22, and the navigation function and so on. The CPU 11 causes the acquired information to be temporarily stored at the memory 15.

In step S13, segmentalization of vehicle information is performed. Specifically, the CPU 11 segmentalizes the vehicle information temporarily stored in step S12 based on the correspondence relationship among the vehicle information, the threshold, and the segment as shown in FIG. 2. On this occasion, the usage information of the content corresponding to the content ID temporarily stored in step S11 is determined with reference to the correspondence relationship between the content and the usage information shown in FIG. 3. For instance, if the started-up content is radio, the usage information segments V1, V6, V7, V8, V9, and V11 that correspond to the radio in FIG. 3 are used.

In step S14, the CPU 11 causes the segmentalized vehicle information together with, for instance, a content name, ID, and URL to be stored at the memory 15. FIG. 4 is a diagram illustrating the state of the stored data. At the fourth line C4 of the data in FIG. 4 are newly stored that a radio content is started up, that the vehicle speed V1 is higher than 0 km/h and equal to or lower than 60 km/h, that the time of day V6 when the radio content is started up is from 6:30 a.m. to 7:00 a.m., that the traveling time V7 is from 10 minutes to less than 20 minutes, that the time taken to reach the destination is from 90 minutes to less than 100 minutes, that the road type V9 is open road, and that the position information V11, such as the altitude and latitude around home is x1, y1. Each time when content is started up, the processing according to the flowchart as illustrated in FIG. 6 is executed. It is assumed that at the first line C1 to the third line C3 of the data in FIG. 4, the vehicle information at the time when each of the contents of radio, weather forecast, and e-mail is started up is already stored.

In step S15, the CPU 11 searches for the same data as the ID of the content that is started up this time from the records stored at the memory 15 as shown in FIG. 4. The content started up this time is the radio content at the fourth line C4 and has an ID of 001. In step S16, the CPU 11 judges whether there is data having ID the same as the content which is started up this time. In the example shown in FIG. 4, the same ID as the ID: 001 of the content that is started up this time is present at the first line C1 of the data recorded and stored at the memory 15 as shown in FIG. 4. Thus the result of judgment is YES and the process proceeds to step S17. If the result of the judgment is NO, this flow is ended.

In step S17, the CPU 11 compares the segments of vehicle information of the content that started up this time with the segments of vehicle information that have the same data as the ID of the content that started up this time. In this example, each segment of the vehicle information at the fourth line C4 is compared with each segment at the first line C1 of the vehicle information in FIG. 4.

Vehicle information common to newest two identical contents may be set as a core condition.

In step S18, the CPU 11 judges whether the result of comparison in step S17 contains one or more segments for which the vehicle information at the fourth line C4 has the same value as the value at the first line C1. In this example, the time of day V6 when the radio content is started up, the traveling time V7, the road type V9, and the position information V11 are segments for which the vehicle information at the fourth line C4 has the same value as the value at the first line C1. For the position information, two positions within 200 m are deemed to be the same value. If the result of judgment is YES in step S18, the process is caused to proceed to next step S19. If the result of judgment is NO in step S18, the flow is ended.

In step S19, the CPU 11 stores, as a core condition, the vehicle information for which a plurality of identical contents have the same value together with the IDs of the contents at the memory 15. FIG. 5 is a diagram showing the state of storage of the core condition. That is, for the radio content, time of day V6 between 6:30 a.m. and 7:00 a.m., traveling time V7 of from 10 minutes to less than 20 minutes, road type V9 being open road, and position information V11 being around home of x1, y1 are stored as core conditions. As described later, if the acquired vehicle information satisfies the core conditions, the radio content is automatically started up. After the core conditions are stored at the memory 15, the flow of FIG. 6 is ended. In this example, the core conditions of the radio content only are described, however, as various contents are repeatedly started up by the operation by the user, the core conditions of various contents come to be stored.

Figure 7:
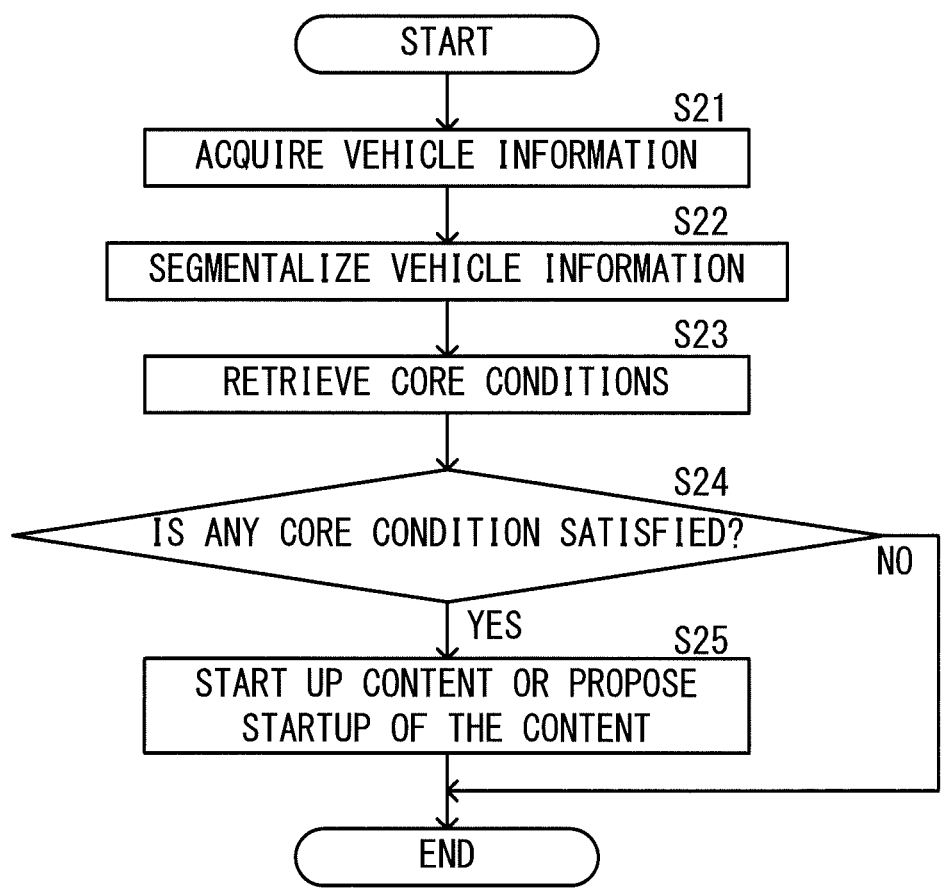
FIG. 7 is a flowchart illustrating execution based on vehicle information.

FIG. 7 is a flowchart illustrating the processing performed by the program that executes contents based on the vehicle information. According to the process illustrated by the flowchart, the operation of the input unit 12 by the user is unnecessary. The vehicle information are acquired while the vehicle is running or being parked, and if such information satisfies the core conditions as shown in FIG. 5, the content such as radio, weather forecast, e-mail, or convenience store retrieval is automatically started up.

The process of the flowchart illustrated in FIG. 7 is periodically executed over fixed intervals. In step S21, the CPU 11 acquires vehicle information in the same manner as that in step S12 as described above. In next step S22, the CPU 11 performs segmentalization of the vehicle information in the same manner as that in step S13 as described above. Then, in step S23, the CPU 11 retrieves the core conditions stored at the memory 15 as shown in FIG. 5 based on the acquired and segmentalized vehicle information.

In step S24, the CPU 11 judges whether the acquired and segmentalized vehicle information corresponds to the vehicle information that is stored as the core conditions, that is, whether the acquired and segmentalized vehicle information satisfies the core conditions. If the CPU 11 judges that the acquired and segmentalized vehicle information satisfies the core conditions, the process proceeds to step S25. If it judges that such vehicle information fails to satisfy the core conditions, it causes the program illustrated by the flowchart to be ended.

In step S25, the CPU 11 automatically starts up the content that satisfies the core conditions. Specifically, in case that the core condition as shown in FIG. 5 is stored, radio is automatically started up if vehicle information is acquired that corresponds to time of day V6 being between 6:30 a.m. and 7:00 a.m., traveling time V7 being from 10 minutes to less than 20 minutes, road type V9 being ordinary/open road, and position information V11 being around home of x1, y1. If a plurality of contents satisfies respective core conditions, a content having a higher priority is preferentially started up. In this case, a smaller priority value indicates higher priority.

In step S25, the CPU 11 causes the content that satisfies the core conditions to be automatically started up, however, the CPU 11 may be configured to propose the startup of the content. To propose the startup content is to inform the user of content to be started up using, for instance, the display unit 13. The user who receives the information may touch the input unit 12 to start up the proposed content.

The process of the startup of content at the content startup control device explained above is summarized as follows.

The CPU 11 of the terminal device 1 receives an instruction of the user who is the vehicle occupant to select a content and start it up (step S11) and acquires information from the vehicle and information on traveling as vehicle information (step S12). When the content is started up, the CPU 11 stores the vehicle information acquired at the time when the content is started up as a startup record for the content (step S14). The CPU 11 creates a startup condition for starting up the content based on the startup record (step S19) and starts up the content related to the startup condition if the acquired vehicle information corresponds to the startup condition (step S23 to S25).

The first embodiment of the present invention provides the following operations and advantageous effects.

The content startup control device includes a reception unit that is, the input unit 12, that receives an instruction from the user to select a content and starts it up, a vehicle information acquisition unit that is, the interface circuit 18, that acquires information from the vehicle and the information on traveling as vehicle information, and a startup control unit, that is, the CPU 11. The CPU 11 stores the vehicle information acquired by the vehicle information acquisition unit 18 when the content is started up based on the instruction received by the input unit 12 as the startup record for the content (step S14). It creates a startup condition under which the content is started up based on the startup record (step S19). Then, it starts up the content related to the startup condition if the vehicle information acquired from the interface circuit 18 corresponds to the startup condition (step S23 to S25).

The content startup control device and the startup method explained above enable various types of information to be output according to the content program with improved operability.

Second Embodiment

Figure 8:
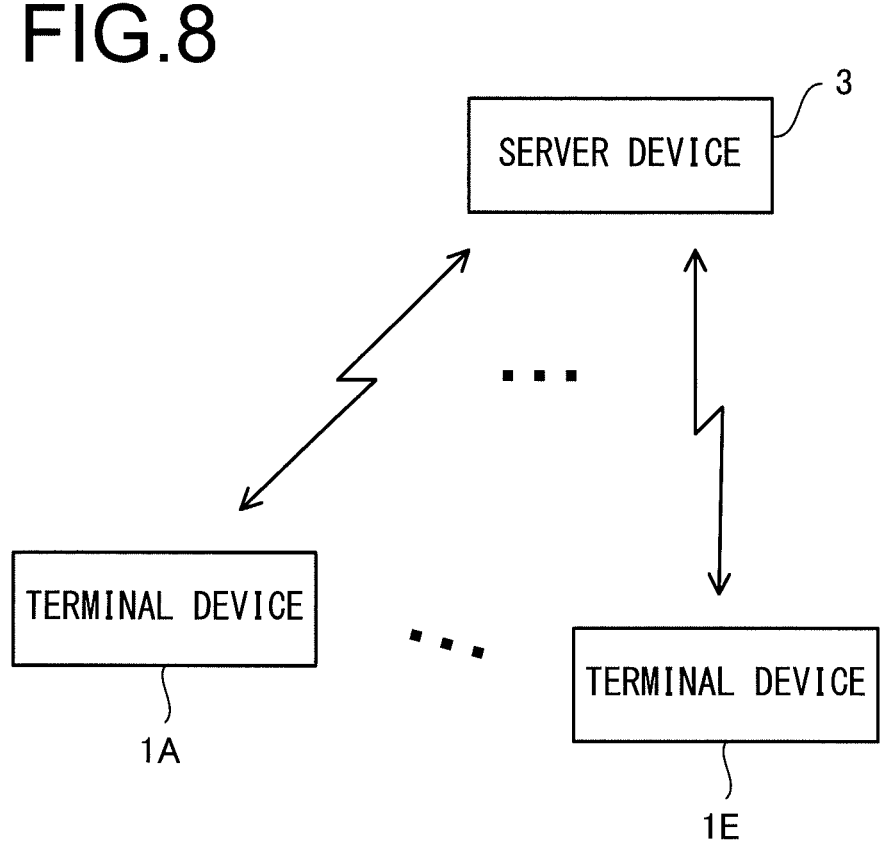
FIG. 8 is a diagram showing an overall system arrangement according to an embodiment of the present invention.

An embodiment in which the content startup system and the content startup method according to the present invention are adopted in a system including a terminal device and a server device is explained with reference to FIGS. 8 to 16. FIG. 8 is a diagram showing a system arrangement of this second embodiment. The system according to the second embodiment is configured to enable a plurality of terminal devices 1A to 1E to perform transmission and reception of data to and from the server device 3. The terminal devices 1A to 1E are mounted on respective vehicles. Each of the terminal devices 1A to 1E has the same configuration as the terminal device 1 explained with respect to the first embodiment and explanation thereon is omitted here. However, the communication unit 20 further performs communication for transmission and reception of data to and from the server device 3.

Figure 9:
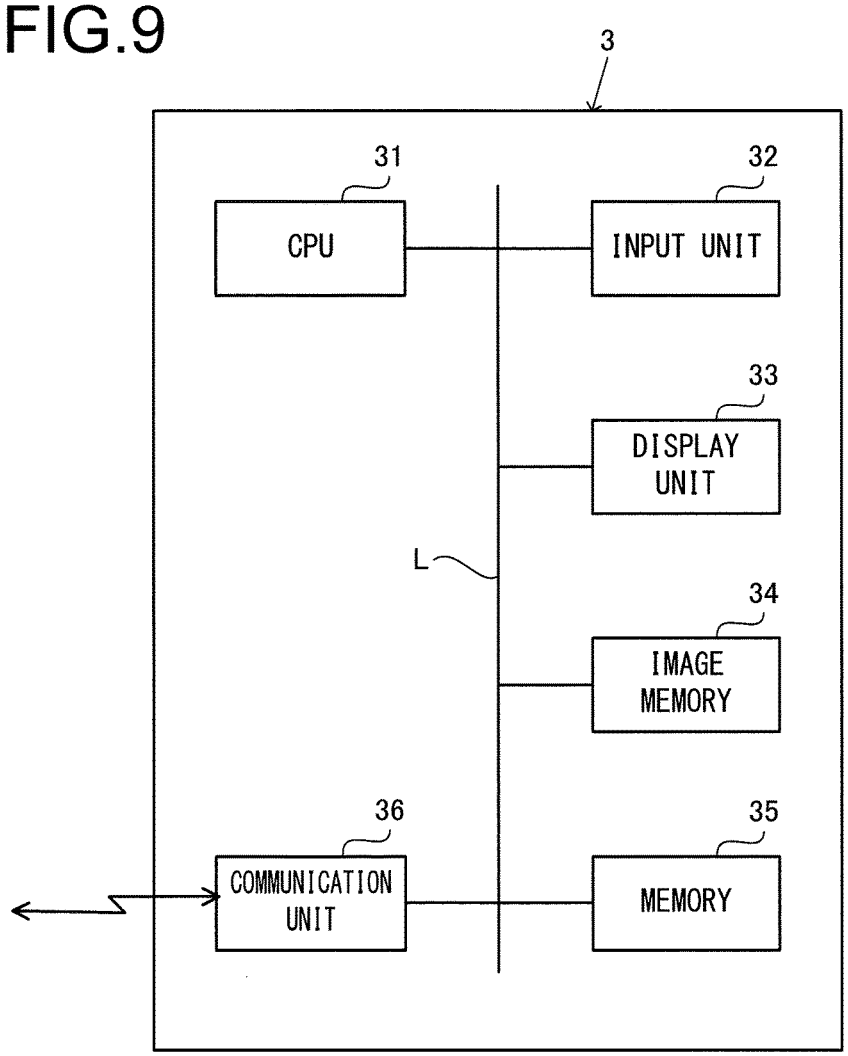
FIG. 9 is a diagram showing the arrangement of a server device.

FIG. 9 is a diagram showing the configuration of the server device 3. In FIG. 9, the server device 3 includes a CPU 31, an input unit 32, a display unit 33, an image memory 34, a memory 35, and a communication unit 36. The circuits are connected to each other via a bus line L.

The CPU 31 accesses the memory 35 and so on to execute a control program to perform various controls. The input unit 32 includes, for instance, a touch panel switch provided on a screen of the display unit 33 and a joystick that instructs movement of cursor or scroll of the screen. The display unit 33, which is a device that displays various screens, includes, for instance, a liquid crystal display. The image memory 34 stores the display data to be output to the display unit 33 as image data. The display data output from the CPU 31, which includes various types of character data and various types of graphic data, is once stored at the image memory 34 and output to the display unit 33.

The memory 35 includes a ROM that stores a control program, a RAM as a working area, and a nonvolatile memory that stores, for instance, various types of set values. The CPU 31 performs the processing for executing the process of the flowchart as described later according to the control program stored at the memory 35. At the memory 35 are stored in advance the correspondence relationships among the vehicle information, threshold, and segment shown FIG. 2 in the same manner as that in the first embodiment and the correspondence relationships between the content and usage information shown in FIG. 3 in the same manner as that in the first embodiment. The communication unit 36 performs transmission and reception of data to and from each of the terminal devices 1A to 1E via the wireless communication line.

FIG. 10 is a diagram showing an example of state of storage of the contents and the vehicle information and their correspondence relationships are stored at the memory 35. Specifically, when the users perform startup operation at the respective terminal devices 1A to 1E to start up various contents, for instance, radio, weather forecast, and e-mail, respective pieces of vehicle information acquired on this occasion are transmitted from the respective terminal devices 1A to 1E to the server device 3. The vehicle information is segmentalized and stored at the memory 35. Each time when content is started up and vehicle information is transmitted from the respective terminal devices 1A to 1E, respective pieces of information are sequentially stored. The vehicle information that is stored is vehicle information that corresponds to the correspondence relationship shown in FIG. 3. Here, the user names A to E indicate that the pieces of vehicle information are transmitted from the terminal devices 1A to 1E, respectively. The storage of the vehicle information is described later. FIG. 10 illustrates an example in which each of the terminal devices 1A to 1E starts up radio content and the vehicle information from each of the terminal devices 1A to 1E is transmitted to the server 3 and stored there.

FIG. 11 is a diagram that shows core conditions of the content and the vehicle information. The core conditions are stored at the memory 35. The core conditions are acquired by comparing a plurality of pieces of vehicle information having the same content among the contents as shown in FIG. 10 with each other and extracting vehicle information having an agreement rate of 80% or more. For instance, in the example shown in FIG. 10, all the contents are radio contents. However, the vehicle speed V1 has 40% for the segment 1 and 60% for the segment 2. Neither the segment 1 nor the segment 2 has an agreement rate of 80% or more. Accordingly, the vehicle speed V1 is not adopted as a core condition. On the other hand, the time taken to reach the destination V8 has 80% for the segment 8 and 20% for the segment 9. Thus, the segment 8 that has an agreement rate of 80% or more is adopted as the core condition for V8. In this manner, V6, V8, and V9 are used as the core conditions as shown in FIG. 11. As described later, the terminal devices 1A to 1E are controlled so that if the acquired vehicle information satisfies the core conditions of content, the content is automatically started up. Priority indicates the order of preferential startup if a plurality of contents are designated as candidate contents for automatic startup. The agreement rate is set 80% or more as an example. It may be 100% or other values.

Hereafter, the operations of the content startup system and the content startup method according to the second embodiment are explained with reference to the flowcharts as shown in FIGS. 12 to 16.

Figure 12:
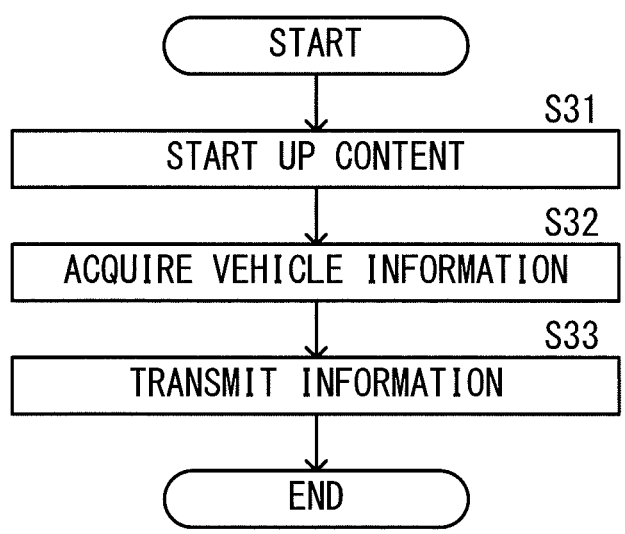
FIG. 12 is a flowchart illustrating transmission of vehicle information upon startup of content at the terminal device.

FIG. 12 is a flowchart illustrating the transmission of vehicle information upon the startup of content in any of the terminal devices 1A to 1E. The configuration of the terminal devices 1A to 1E is the same as that shown in FIG. 1 and explanation is made based on the construction shown in FIG. 1. The flowchart illustrated in FIG. 12 is executed each time when the user operates the input unit 12 to start up content such as radio, weather forecast, e-mail, or convenience store retrieval. The program illustrated by the flowchart is stored at the memory 15 and executed under control of the CPU 11.

In step S31 of FIG. 12, the CPU 11 starts up the content selected by the operation of the user. Specifically, if the user operates the input unit 12 using a touch panel or the like to specify a content from a menu, for instance, radio, weather forecast, e-mail, and convenience store retrieval brought up on display in the form of a list at the display unit 13, the CPU 11 starts up the specified content and outputs it to, for instance, the display unit 13. For instance, for radio content, if the user specifies an item of radio from the menu and selects a radio station, then the CPU 11 starts up the specified radio. As a result, the broadcast program that is on air on the radio is output to the voice output unit 19. The content started up is temporarily stored at the memory 15 together with the ID, the URL, and the user name. The user name indicates which one of the terminal devices 1A to 1E is operated and is represented by one of alphabets A to E corresponding to the operated terminal device among the terminal devices 1A to 1E.

Next, in step S32, the CPU 11 acquires various pieces of information, such as vehicle speed, ON/OFF of the wiper, ON/OFF of the headlight, ON/OFF of the winker, and fuel level, as vehicle information from the vehicle via the interface circuit 18. The CPU 11 also acquires various pieces of information, such as present time of day, traveling time from the start of traveling, time taken to reach the destination, road type, traffic jam information, and position information, as vehicle information from, for instance, the GPS reception unit 21 and the VICS reception unit 22 and navigation function. The various pieces of acquired vehicle information are temporarily stored at the memory 15.

Then, in next step S33, the CPU 11 transmits the user name, the content name, the ID, the URL, and the vehicle information to the server device 3 via the communication unit 20.

Figure 13:
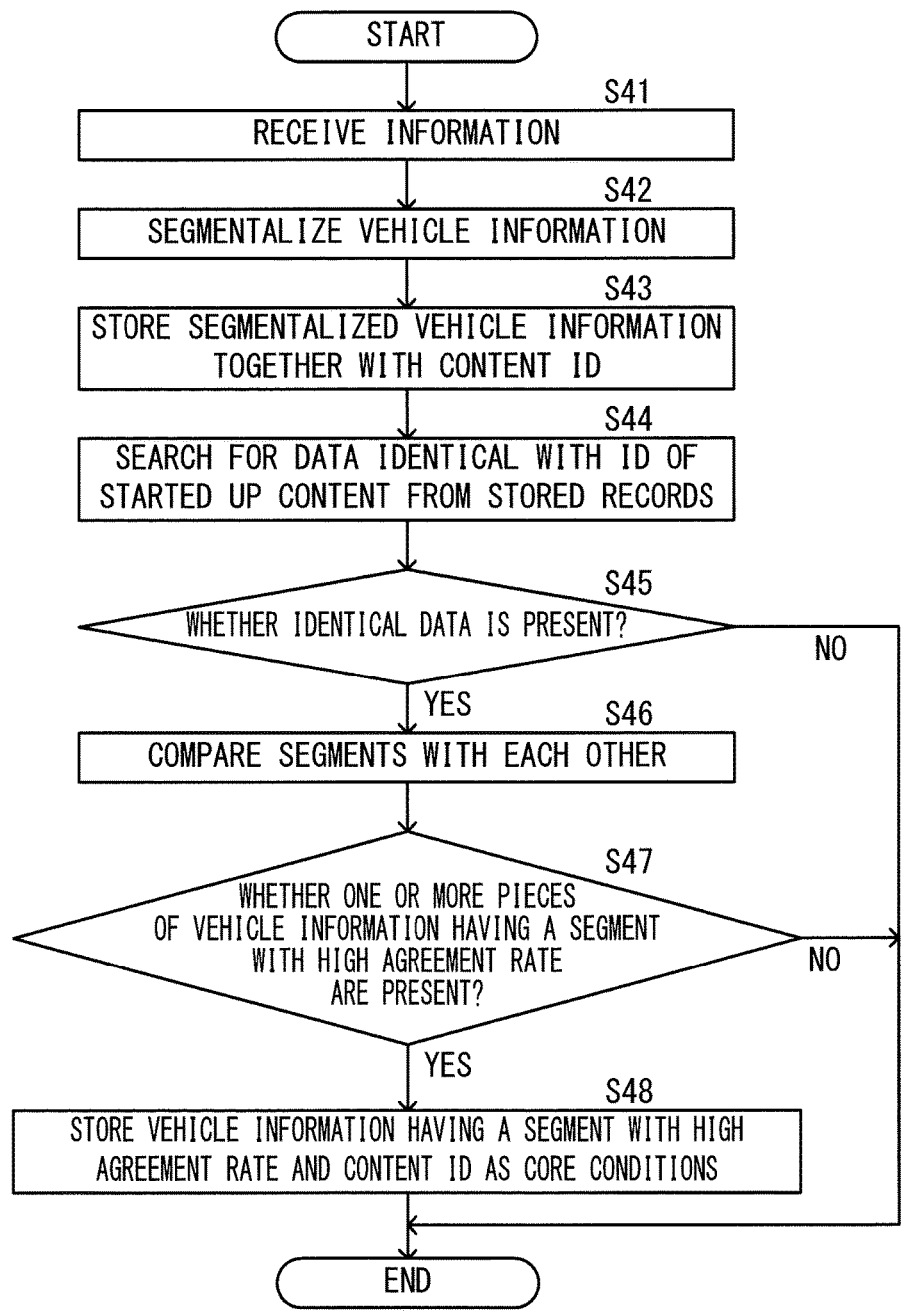
FIG. 13 is a flowchart illustrating storage of vehicle information at the server device.

FIG. 13 is a flowchart illustrating the storage of the vehicle information at the server device 3. In step S41, the CPU31 receives the vehicle information and the like transmitted from each of the terminal devices 1A to 1E via the communication unit 36.

In step S42, the vehicle information is segmentalized. Specifically, the CPU 31 segmentalizes the vehicle information received in step S41 based on the correspondence relationships among the vehicle information, the threshold, and the segment shown in FIG. 2. On this occasion, usage information is determined based on the correspondence relationships between content and usage information as shown in FIG. 3. For instance, if the started-up content is radio, the usage information V1, V6, V7, V8, V9, and V11 corresponding to the radio content shown in FIG. 3 is used.

In step S43, the CPU31 stores the segmentalized vehicle information together with the user name, the content name, the ID, and the URL at the memory 35. FIG. 10 is a diagram showing the state of the storage. Each time when content is specified at the menu screen by the user operation at the terminal devices 1A to 1D, the program that executes the processing illustrated by the flowcharts in FIG. 12 and FIG. 13 is started up. Here, it is assumed that as shown in FIG. 10, the radio content was started up at each of the terminal devices 1A to 1D and the vehicle information at the time of startup has been stored at the server device 3. Then, it is assumed that this time, the data shown at the lowest line in FIG. 10 is transmitted from the terminal device 1E to the server device 3.

In step S44, the CPU 31 searches for the same data as the ID of the content that is started up this time from the records stored at the memory 35 as shown in FIG. 10. The content started up this time is the radio content at the lowest line (user name E) and has an ID of 001. In step S45, the CPU 31 judges whether data having the same ID as that of the content transmitted this time is present. In the example shown in FIG. 10, an ID that is the same as ID: 001 of the content transmitted this time is found at lines 1 to 4 of the data stored at the memory 35 as shown in FIG. 10. Consequently, the result of the judgment is YES and the process proceeds to step S46. If the result of the judgment is NO, the flow is ended.

In step S46, the CPU 31 compares segments of vehicle information of the content transmitted this time with the segments of the vehicle information having the same data as the ID of the content transmitted this time. In this example, the CPU 31 compares each segment of the vehicle information at the lowest line in FIG. 10 with each segment of the vehicle information at lines 1 to 4 in FIG. 10. In this case, the CPU 31 compares pieces of vehicle information having an agreement rate of 80% or more with each other. As shown in FIG. 10, among pieces of data having the content name of radio, the vehicle information having an agreement rate of 80% or more includes time of day V6, time taken to reach the destination V8, and road type V9.

In step S47, the CPU 31 judges whether one or more segments of the vehicle information has an agreement rate of 80% or more in the result of comparison in step S46. In this example, the segments of time of day V6, time taken to reach the destination V8, and road type V9 meet the requirements and thus the CPU 31 judges that one or more segments of the vehicle information has an agreement rate of 80% or more. If the result of the judgment in step S47 is YES, the process proceeds to step S48. If the result of the judgment is NO, the flow is ended.

In step S48, the CPU 31 stores the vehicle information having an agreement rate of 80% or more together with the content ID as the core conditions at the memory 35. FIG. 11 is a diagram illustrating the state of storage of the core conditions. That is, for the radio content, the CPU 31 stores, as the core conditions, the time of day V6 being between 6:30 a.m. and 7:00 a.m., the time taken to reach the destination V8 being from 80 minutes to less than 90 minutes, and the road type V9 being open road. As described later, if the vehicle information received from a terminal device satisfies the core condition, the radio content of the said terminal device is automatically started up. After the core condition is stored at the memory 35, the flow in FIG. 13 is ended. In this example, only the core conditions of the radio content are described, however, repetition of startup of various contents by the users results in storage of the core conditions of various contents.

Figure 14:
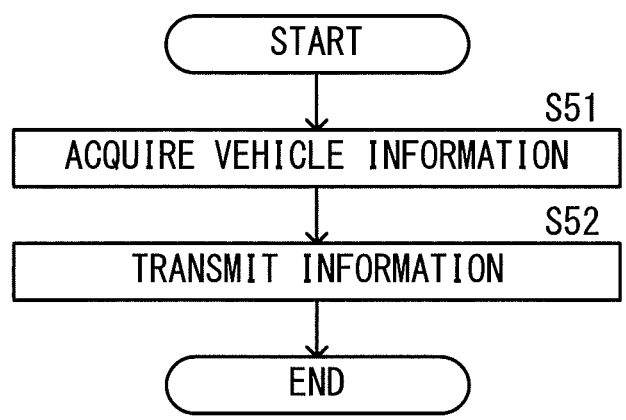
FIG. 14 is a flowchart illustrating transmission of vehicle information at the terminal device.

FIG. 14 is a flowchart illustrating transmission of vehicle information in any of the terminal devices 1A to 1E. According to the processing illustrated in the flowcharts of FIG. 14 to FIG. 16 described below, the operation of the input unit 12 by the user is unnecessary. If the vehicle information transmitted to the server device 3 satisfies the core conditions, a corresponding content, for instance, radio, weather forecast, e-mail, or convenience store retrieval is automatically started up at the corresponding terminal device in response to a startup command from the server device 3.

The process of the flowchart in FIG. 14 is periodically executed at specified time intervals at each of the terminal devices 1A to 1E. In step S51, the CPU 11 acquires various pieces of information including vehicle speed, ON/OFF of the wiper, ON/OFF of the headlight, ON/OFF of the winker, and fuel level as vehicle information from the vehicle via the interface circuit 18. The CPU 11 also acquires various pieces of information including present time of day, traveling time from the start of traveling, time taken to reach the destination, road type, traffic jam information, and position information as vehicle information from the VICS reception unit 22, the GPS reception unit 21, and the navigation function and so on. In step S52, the CPU 11 transmits the acquired vehicle information together with user name, content name, and ID to the server device 3 via the communication unit 20.

Figure 15:
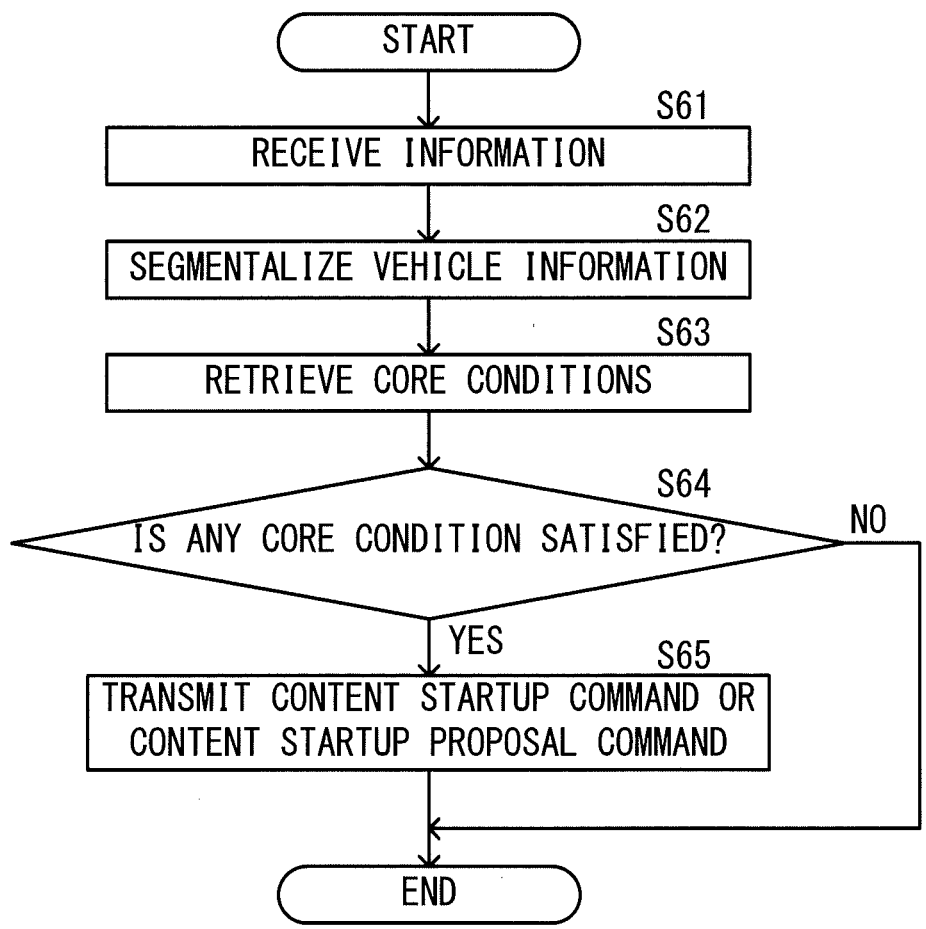
FIG. 15 is a flowchart illustrating retrieval of core conditions at the server device.

The process illustrated by the flowchart shown in FIG. 15 is executed at the server device 3 each time when the server device 3 receives information from any of the terminal devices 1A to 1E. In step S61, the CPU 31 receives information from the respective terminal devices 1A to 1E via the communication unit 36.

In step S62, the segmentalization of vehicle information is performed. Specifically, the CPU31 segmentalizes the vehicle information received in step S61 based on the correspondence relationships among the vehicle information, the threshold, and the segment as shown in FIG. 2. On this occasion, usage information is determined with reference to the correspondence relationship between the content and the usage information as shown in FIG. 3. For instance, if the started-up content is radio, usage information V1, V6, V7, V8, V9, and V11 that corresponds to the radio content in FIG. 3 is used. Then, in step S63, the CPU 31 retrieves the core conditions stored at the memory 35 based on the vehicle information that is received and segmentalized as shown in FIG. 11.

In step S64, the CPU 31 judges whether the vehicle information that is received and segmentalized satisfies the core conditions. If the CPU 31 judges that the vehicle information satisfies the core condition, the process proceeds to step S65. If the CPU 31 judges that the core condition is not satisfied, the flow is ended.

In step S65, the CPU 31 transmits a startup command to start up a content or a proposal command to propose the startup of a content to the terminal device from which the CPU 31 received the information in step S61. Specifically, the CPU 31 transmits information that includes the content name and ID that satisfy the core conditions and also a startup command or a proposal command to such terminal device.

Figure 16:
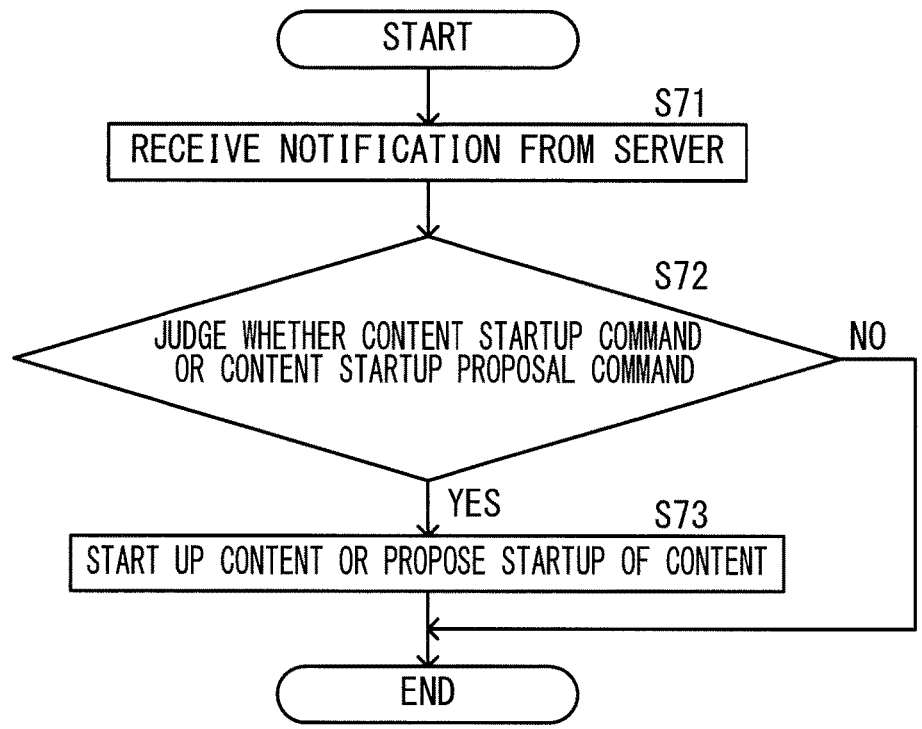
FIG. 16 is a flowchart illustrating reception of a command at the terminal device.

FIG. 16 is a flowchart illustrating the reception processing for a command at a terminal device. In step S71, the CPU 11 receives a notification from the server device 3 via the communication unit 20. In step S72, the CPU 11 judges whether the notification from the server device 3 is a startup command or a proposal command. If the notification is a startup command or a proposal command, the process proceeds to step S73 and the CPU 11 allows the content indicated by the notification to be automatically started up or proposes the startup of such content. To propose the startup of content is to inform the user through, for instance, the display unit 13 that a content to be started up is present. The user who is informed only needs to touch the input unit 12 to enable startup of the proposed content. The CPU 11 causes the processing of the flowchart to be ended if the notification from the server device 3 is other than a startup command or a proposal command in step S72.

The process of starting up content by the content startup system explained above is summarized as follows.

At the terminal device 1, an instruction of a vehicle occupant, who is a user, is received to select and then to start up a content (step S31). Information from the vehicle and information on traveling is acquired as vehicle information (step S32, S51). The vehicle information acquired when a content is started up in response to the instruction received is transmitted as a startup record of the content (step S33, S52). On the other hand, at the server device 3, the vehicle information and the startup record are received (step S41, S61). The received startup record is stored and a startup condition under which the content is to be started up is created based on the startup record (step S43 to S48). If the received vehicle information corresponds to the startup condition, the startup of the content related to the startup condition is instructed to the terminal device 1 (step S63 to S65). The terminal device 1 starts up the content in step S73, if the startup instruction received in step S71 is a startup command. On the other hand, if the startup instruction received in step S71 is a proposal command, the startup of the content is proposed in step S73.

In the second embodiment explained above, the following operations and advantageous effects are obtained.

The terminal device 1 includes a reception unit, i.e., the input unit 12, that receives an instruction of the user on a content and selects and starts up the content, a vehicle information acquisition unit, i.e., the interface circuit 18, that acquires information from the vehicle and information on traveling as vehicle information, and a transmission unit, i.e., the communication unit 20, that transmits the vehicle information acquired when a content is started up based on the instruction received by the input unit 12, as the startup record of the content. On the other hand, the server device 3 includes a reception unit, i.e., the communication unit 36, that receives the startup record and the vehicle information from the terminal device 1, a storage unit, i.e., the memory 35, that stores the received startup record, and a content startup control unit, i.e., the CPU 31, that creates a startup condition under which a content is to be started up based on the startup record and causes the terminal device 1 to start up a content related to the startup condition if the vehicle information transmitted from the terminal device 1 corresponds to the startup condition.

According to the second embodiment of the present invention, the server device 3 is configured to acquire a content startup situation and the vehicle information of each of the terminal devices 1A to 1E to create the startup conditions. This enables the terminal devices 1A to 1E to be operated easier than ever when a content is started up to output various types of information. At the server device 3, the core conditions are created. This makes it possible to issue a startup instruction having versatility such that the core condition matches the liking of a plurality of users. Also, this enables updating the algorithm for creating core conditions as needed.

VARIATION EXAMPLE

The present invention may also be achieved by modifying the first and second embodiments as follows.

(1) Priority has been explained taking an example in which priority is fixed according to the content in advance. However, a configuration may be adopted in which the number of times in which the content is selected is counted and priority is automatically set to be higher for a content which is counted more times.

(2) Explanation has been made on an example in which storage and execution of contents are performed as related to the terminal device. However, a configuration may be adopted in which the user who uses the terminal device is recognized by fingerprint authentication and the storage and execution of contents are performed as related to the user who uses the terminal device.

(3) The core conditions may be created based on the vehicle information acquired when the content is selected instead the vehicle information acquired when the content is started up.

(4) The input unit 12 is not limited to a touch panel or a switch. A configuration may be adopted in which the speech of the vehicle occupant is subjected to voice recognition to identify content and the identified content is started up.

(5) Instead of the terminal device mounted in the vehicle, mobile electronic equipment, such as a smartphone, which is brought into the vehicle and used in place of the in-vehicle terminal, may be provided with a similar function.

(6) In the above explanation, explanation has been made on the case in which the data stored at the memory 15 shown in FIG. 4 include two sets of data related to an identical content. If the data includes three or more sets of data related to the identical content, vehicle information that is common among the three or more sets of data is stored as a core condition for the content. The same is true for the case in which four or more sets of data related to the identical content become present as time elapses.

(7) The present invention may be adopted in-vehicle devices that implement only one content or in mobile electronic equipment, such as a smartphone, that implements only one content.

(8) Explanation has been made on the example in which the system including a terminal device and a server device according to the second embodiment is configured to acquire a core condition based on respective pieces of information from a plurality of terminal devices. However, the system including a terminal device and a server device may also be configured to acquire the core condition based on the information from a single terminal device or a single user.

The present invention is not limited to the above embodiments and variation examples. Any other forms or modifications conceivable within the technical concept of the present invention are included within the scope of the present invention so far as the features of the present invention are not damaged. The embodiments and the variation examples described above may be combined in any fashion.

According to the embodiments and variation examples of the present invention explained above, if the vehicle information acquired by the terminal device is identical with the vehicle information acquired at the startup of a content in the past, the same content as the content started up in the past can be started up with ease in the absence of an a content startup instruction from the vehicle occupant.

What is claimed is:
1. A content startup control device comprising:
a user interface that receives an instruction from a user to select a content among a plurality of contents of a different type;
an interface circuit that acquires current information from a vehicle and/or current information on traveling as a temporary vehicle information;
a memory that stores a recorded vehicle information, which is extracted from the temporary vehicle information acquired by the interface circuit when the content is selected or started up in response to the instruction received by the user interface, as a startup record of the content; and
a central processing unit that creates a startup condition under which the content is to be started up based on the startup record;
wherein, if the recorded vehicle information corresponds to the startup condition, the central processing unit proposes startup of a content related to the startup condition or starts up the content related to the startup condition; and
wherein the memory extracts a part of the temporary vehicle information as the recorded vehicle information depending on the type of the content.
2. The content startup control device according to claim 1, wherein:
the central processing unit stores the recorded vehicle information a type of which is common to a plurality of startup records relating to the same type of content as a core condition as the startup condition of the type of content.

3. The content startup control device according to claim 1, wherein:
the recorded vehicle information is recorded with a segmented value based on a predetermined threshold.

4. A content startup method comprising:
receiving an instruction from a user to select a content among a plurality of contents of a different type;
acquiring current information from a vehicle and/or current information on traveling as a temporary vehicle information;
storing a recorded vehicle information extracted from the temporary vehicle information acquired when the content is selected or started up in response to the instruction received as a startup record of the content;
creating a startup condition under which the content is to be started up based on the startup record of the content; and
proposing startup of a content related to the startup condition or starting up the content related to the startup condition if the recorded vehicle information corresponds to the startup condition wherein:
extracts a part of the temporary vehicle information as the recorded vehicle information depending on the type of the content.

5. A content startup system comprising:
a terminal device and a server device, wherein:
the terminal device includes:
a user interface that receives an instruction from a user to select a content among a plurality of contents of a different type;
an interface circuit that acquires current information from a vehicle and/or current information on traveling as a temporary vehicle information; and
a transmission unit that transmits the temporary vehicle information, which is acquired by the interface circuit when a content is selected or started up in response to the instruction received by the user interface, as a temporary startup record of the content; and
the server device includes:
a receiver that receives the temporary startup record transmitted by the transmission unit;
a selection unit that stores selected information among the temporary startup record received by the receiver to the storage unit as a recorded startup record comprising a recorded vehicle information; and
a central processing unit that creates a startup condition under which the content is to be started up based on the selected information;
wherein, if the recorded vehicle information corresponds to the startup condition, the central processing unit proposes startup of a content related to the startup condition to the terminal device or causes the terminal device to start up the content; and
wherein the selection unit selects a part of the temporary startup record as the recorded startup record depending on the type of the content.

6. The content startup system according to claim 5, wherein:
the selection unit stores a plurality of sets of the selected information relating to a plurality of users, respectively; and
the central processing unit stores recorded vehicle information common to the plurality of sets of the selected information relating to an identical content in the received vehicle information as a startup condition.

7. A content startup method in a system including a terminal device and a server device, the method comprising:
at the terminal device,
receiving an instruction from a user to select a content among a plurality of contents of a different type;
acquiring current information from a vehicle and/or current information on traveling as a temporary vehicle information; and
transmitting the temporary vehicle information acquired when the content is selected or started up in response to the received instruction, as a temporary startup record of the content; and
at the server device,
receiving the temporary vehicle information and the temporary startup record that have been transmitted;
storing selected information among the received temporary startup record as a recorded startup record comprising a recorded vehicle information;
creating a startup condition under which the content is to be started up based on the selected information; and
if the recorded vehicle information corresponds to the created startup condition, proposing startup of a content related to the created startup condition to the terminal device or causing the terminal device to start up the content related to the created startup condition wherein:
selecting a part of the temporary startup record as the recorded startup record depending on the type of the content.

* * * * *